Oct. 16, 1934.  E. H. KRUSE  1,977,282
SURGICAL INSTRUMENT
Filed May 24, 1933  2 Sheets-Sheet 1
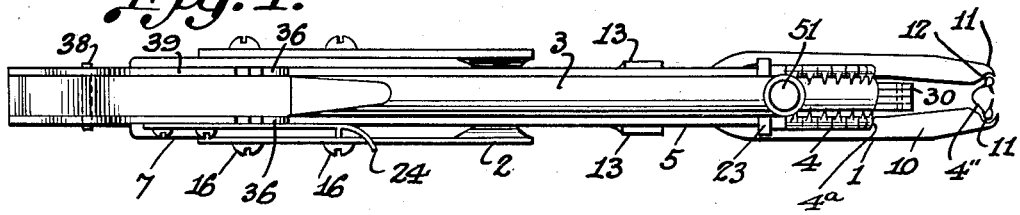
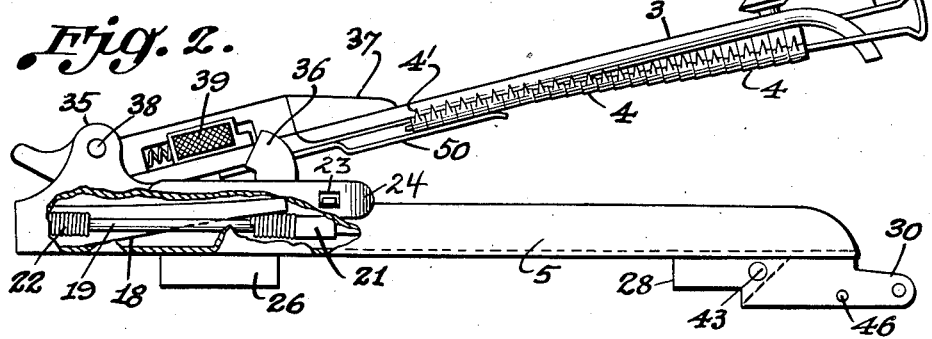
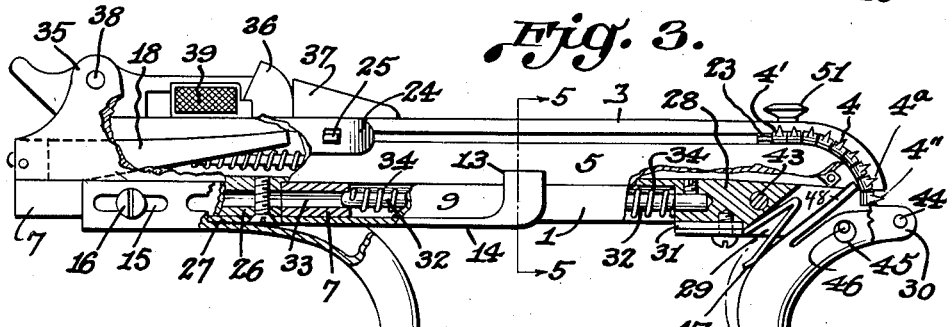
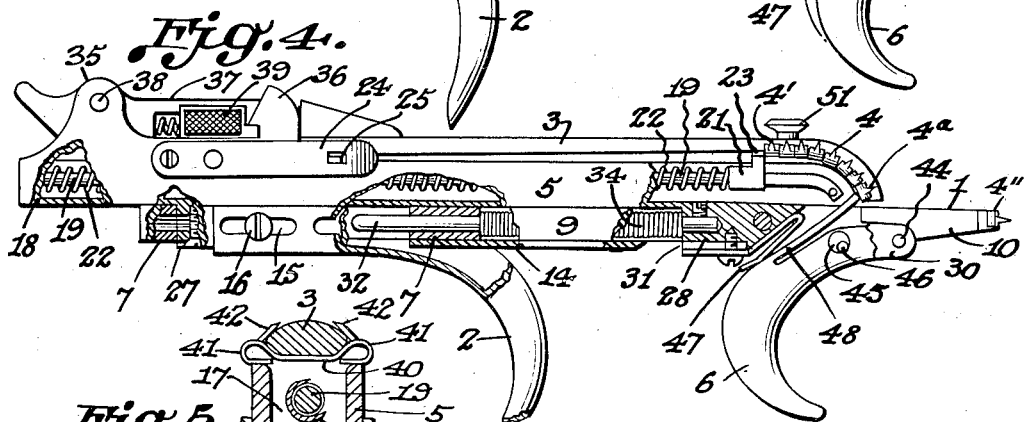
Inventor:
Edward H. Kruse
by J. J. Burns Attorney.

Oct. 16, 1934.  E. H. KRUSE  1,977,282
SURGICAL INSTRUMENT
Filed May 24, 1933   2 Sheets-Sheet 2
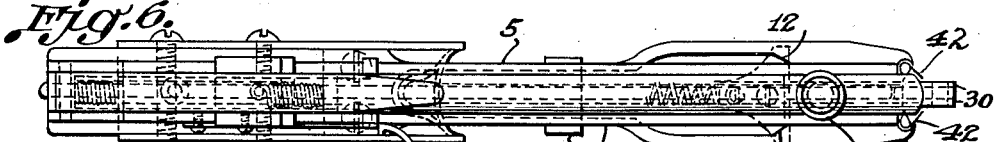
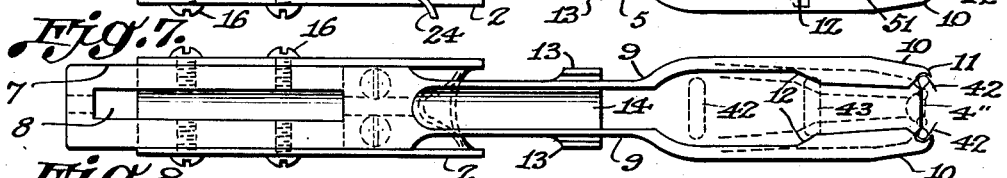
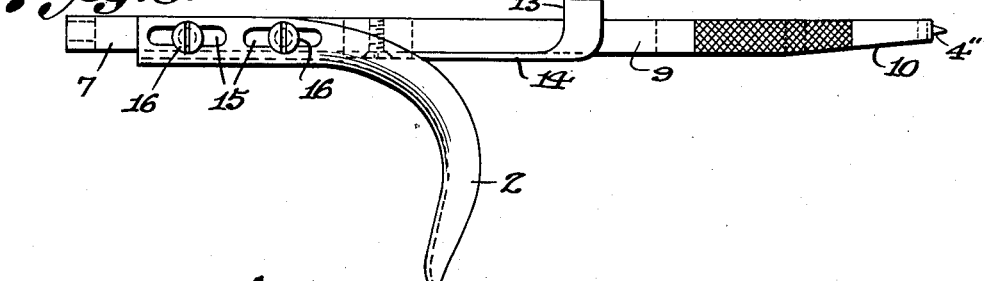
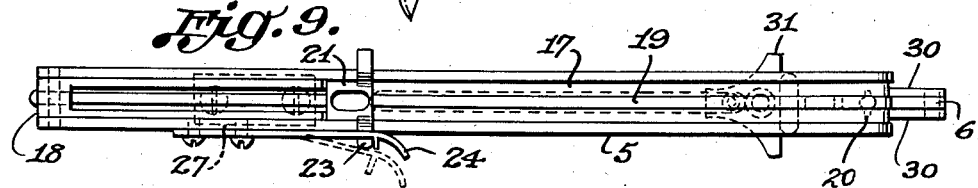
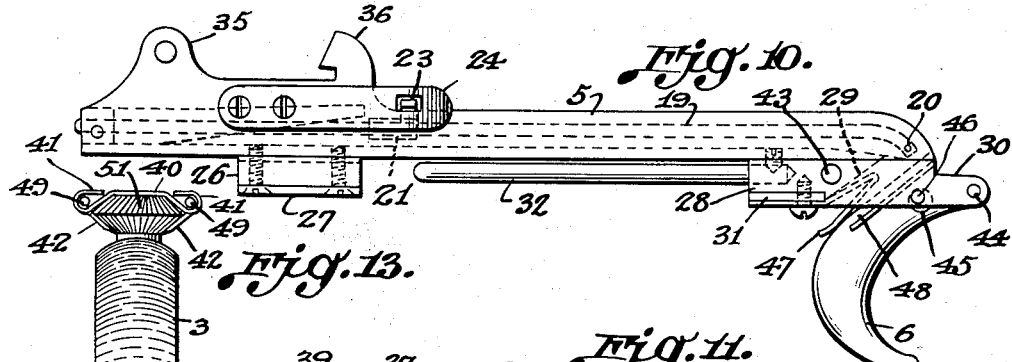
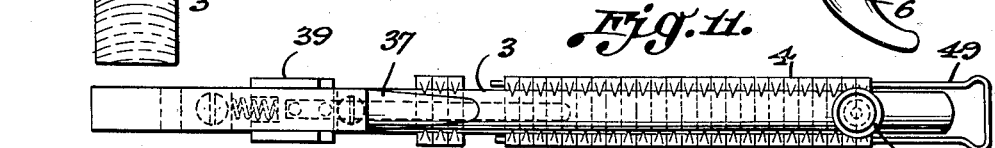
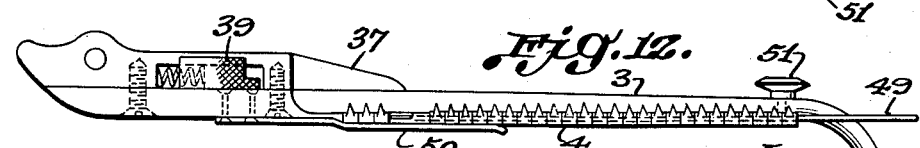
Inventor:
Edward H. Kruse
by H. G. Burns Attorney.

Patented Oct. 16, 1934

1,977,282

UNITED STATES PATENT OFFICE 1,977,282

SURGICAL INSTRUMENT

Edward H. Kruse, Fort Wayne, Ind., assignor of one-half to Paul Dole, Fort Wayne, Ind.

Application May 24, 1933, Serial No. 672,599

5 Claims. (Cl. 128—333)

This invention relates to improvements in surgical instruments, more particularly, for applying ligatures to close incisions and lacerations.

One of the objects of the invention is to provide forceps in conjunction with a magazine arranged operatively therewith whereby ligatures are applied singly in succession in making sutures. Other objects of the invention will appear in the following disclosure:

An illustrative embodiment of the invention is shown in the accompanying drawings, in which:—

Fig. 1 is a top plan view of an instrument embodying the invention showing the forceps in extended position and with a ligature in position as applied;

Fig. 2 is a side elevation of the supporting frame and magazine thereon in open position which forms part of the instrument, portions being broken away;

Fig. 3 is a side elevation of the instrument with parts cut away and with the forceps in normal ligature receiving position;

Fig. 4 is a similar view of the instrument with the forceps in extended position for applying a ligature;

Fig. 5 is an enlarged transverse section of Fig. 3 on the line 5—5 thereof;

Fig. 6 is a top plan view of the instrument with the forceps in normal ligature receiving position;

Fig. 7 is a top plan view of the forceps;

Fig. 8 is a side elevation projected from Fig. 7;

Fig. 9 is a top plan view of the supporting frame for the magazine;

Fig. 10 is a side elevation projected from Fig. 9;

Fig. 11 is a top plan view of a ligature holder with ligatures applied to the magazine;

Fig. 12 is a side elevation projected from Fig. 11; and

Fig. 13 is an enlarged front elevation of the magazine and gauge knob thereon and a ligature applied to the gauge knob.

The illustrative embodiment of the invention consists of forceps 1 and a complemental handrest 2 therefor; a magazine 3 for supplying ligatures 4 to the forceps; a slide 5 to support the magazine; and a trigger 6 in connection with the slide for operating it and for controlling the ligatures supplied from the magazine to the forceps.

The forceps constitute tweezers having a stock 7 provided with an elongated slot 8 therein and spring arms 9 spaced apart extending from one end. The outer ends of said arms 9 are provided with corresponding jaws 10 oppositely disposed that have notches 11 made respectively in their inner faces adjacent their outer ends and have respective cam faces 12 that are disposed convergently toward and spaced back from the outer ends or tips of said jaws. The arms 9 are preferably integral with the stock 7 and extend loosely between guides 13 which project upwardly from a bracket 14 that is secured to the stock, and are made of spring metal and adapted to be sprung relatively toward and from each other. The stock has secured thereto a hand-rest 2 which extends pendently therefrom and has slots 15 through which screws 16 are applied to the stock for securing the hand-rest so as to permit longitudinal adjustment thereof relative to said forceps.

The slide 5 has therein a longitudinal channel 17 that extends through the front end thereof, and to the slide in the channel at its rear end is secured a bifurcated bracket 18 in the closed end of which is mounted a guide-rod 19 that is held thereby suspended in the channel. The slide is formed at its forward end so that the upper edges of its sides are curved downwardly, and the forward end of the guide-rod also curves downwardly and is provided with laterally projecting stops 20 adapted to limit forward movement of a feeder 21 that is slidably mounted on the guide-rod. A compression spring 22 disposed concentrically on the guide-rod between the feeder 21 and the closed end of the bracket 18 acts to urge the feeder forwardly on the guide-rod. The feeder is provided with lateral arms 23 that overhang the corresponding sides of the slide, and a spring latch 24 secured on one side of the slide and provided with a latch opening 25 therein is adapted to have locking engagement with the corresponding lateral arm of the feeder and thereby arrest the feeder when moved to its rearmost position. The slide has a pendent guide 26 spaced from its rear end that extends into the slot 8 in the stock 7 of the forceps when the slide is positioned thereon, and a plate 27 secured to the bottom of the guide lug underlaps the stock of the forceps and thereby prevents removal of the slide therefrom. The guide lug is so proportioned relative to the slot 8 in the stock as to permit limited longitudinal relative movement between the slide and forceps. Also, the slide when in place on the forceps lies between the guides 13 which hold the slide properly alined with the forceps.

The forward end of the slide 5 has a pendent block 28 provided in its front portion with a slot 29 and forwardly projecting arms 30 between which is pivoted the trigger 6. A plate 31 is secured to said block that underlaps the jaws 10 of the forceps and thereby retains the slide and forceps in proper connection for relative longitudinal sliding movement.

The block 28 has secured therein a rearwardly extending guide-rod 32 that has sliding movement in an opening 33 in the forward end of the stock 7, and a compression spring 34 is disposed concentrically on said guide-rod between the block 28 and said stock, which spring acts to urge forward movement of the slide relative to the forceps.

The slide 5 has also on its rear portion at the sides thereof upwardly extending brackets 35 and complemental latch hooks 36 spaced therefrom hereinafter referred to.

The ligature magazine 3 constitutes a rail the forward end of which is curved downwardly and its rear end has secured upon its top a supporting lug 37 that is pivoted between the brackets 35 on the slide so as to have vertical swinging movement upon its pivot 38. The lug has movably mounted therein a spring-pressed latch 39 that has locking engagement with the latch hooks 36 when the rail is swung down onto the bracket 18 into its operating position. In this manner the rail is sustained over the channel in a position parallel with the top of the slide. In cross-section the rail is suitably shaped to have sprung and frictionally held thereon in successive order a series of ligature clips 4 of a well-known type, or such that have a pliant back 40, side loops 41 and convergent spurs 42.

When the clips are arranged in proper formation on the rail, their backs extend beneath the rail, their loops overhang the sides of the slide and their spurs are clasped loosely over the corresponding sides of the rail so that the entire assemblage of clips may be moved along the rail toward its outer end by the pressure of the feeder 21 which has bearing engagement with the rearmost clip 4' when the magazine is in operating position and the feeder is released from engagement with the latch spring 24.

When the slide and the magazine rail are in normal position with respect to the forceps, the notches 11 in the jaws 10 of the forceps are then alined with the down-turned extremity of the rail so as to receive the corresponding loops 41 of the foremost clip 4'' which is moved into position therebetween as the group of clips moves forwardly on the rail by the pressure of the feeder. While thus disposed between the jaws of the forceps the foremost clip 4'' rests upon the tops of the arms 30, so that over-running of the succeeding clips is prevented.

The jaws 10 of the forceps, when the slide is in normal position, are held a definite distance apart by means of a gauge pin 43 secured transversely in the block 28, the ends of which engage the divergent cam faces 12 so that the jaws 10 are held properly spaced apart to permit loading of the foremost clip into the forceps with its loops disposed in the notches 11.

The operating trigger 6 extends loosely into the slot 29 in the block 28 and is secured to the arms 30 by a pivot 44, and has an opening 45 through which a pin 46 secured in said arms extends. The opening 45 is so proportioned relative to said pin as to permit limited swinging movement of the trigger upon its pivot. A spring 47 is disposed between the block 28 and the back of the trigger for holding the trigger normally in its forward position. The trigger 6 is provided with a projecting finger 48, the free end of which terminates at a point located, when the trigger is in normal position, back of the down-turned end of the rail 3 a sufficient distance to clear the clip 4ª on the extreme end of the rail. The finger is disposed so that when the trigger is pulled backwardly to operate the slide its free end bears against the back of the clip 4ª with such force as to stall feeding movement of the clips on the rail and also spring said rail upwardly. In this manner the clip 4'' in the forceps is cleared of contact with the next succeeding clip 4ª on the rail as the slide with its magazine is moved back from loading position, and is retained on the rail until the slide is returned to normal position and the trigger is released.

Ligatures of the type suited for use with the instrument are generally supplied in groups arranged on an U-shaped wire holder 49 with the arms thereof extending through the loops of the clips so that the clips are held on the holder uniformly in successive order with their spurs alined in opposite rows. While thus arranged upon the holder the group of clips 4 are conveniently applied to the magazine rail 3 by first releasing the latch 39 from the latch hooks 36 and swinging the rail upwardly (Fig. 2) and then pressing the row of clips into connection with the rail along the lower side thereof so that their spurs are sprung past the corresponding edges of the rail, after which the holder is withdrawn from the loops, leaving the clips clinging to the rail. The rail is then lowered and latched in operating position and the feeder 21 is released from locked engagement with its latch 24, whereupon it moves under pressure of the spring 22 into engagement with the rearmost clip 4' on the rail.

As a means to prevent the clips on the rail from moving back as far as the locked position of the feeder, a tongue 50 is secured at its rear end to the bottom face of the rail, and its forward portion projects forwardly and underlies the rearmost of the clips that are mounted on the rail, and in this manner jamming of the clips, due to improper engagement with the feeder, is obviated.

In applying the clips to the rail it is desirable that the spurs of the clips on the supply holder are spaced uniformly apart to receive the rail. For the purpose of spreading the spurs uniformly, preparatory to the application of the clips to the rail, a gauge-knob 51 is mounted on the instrument at any convenient place, as on the top of the rail 3, where it is accessible for use. The clips, while grouped on their holder, are applied to the gauge-knob so that the knob is pressed between the spurs of the clips whereby the spurs are spread apart the proper distance for reception of the rail when applied thereto.

In use, the instrument is held with its hand-rest 2 bearing in the palm of the hand, the jaws 10 of the tweezers disposed between the thumb and forefinger, and the trigger 6 engaged by the second finger. Upon pulling the trigger backwardly the finger 48 thereon bears against the clip 4ª causing slight elevation of the outer end of the rail and prevents feeding movement of the clips, and also the slide together with the magazine is moved backwardly to its rearmost position so that the jaws of the tweezers protrude forwardly with the foremost clip 4'' held between their outer ends. (Figs. 1 and 4). When the slide is thus positioned, the pin 43 being out of contact with the cam faces 12, the jaws are moved toward each other by pressure of the thumb and forefinger, and thus the clip 4" is clinched so that its spurs are brought together. Upon removal of pressure of the thumb and forefinger from the tweezers the jaws spring apart and release the clinched clip. While performing this operation the spurs of the clip are applied to the flesh upon opposite sides of an incision so that when the clip is clinched a suture is thereby formed.

When the trigger is released the slide with its magazine is moved forwardly to its normal position by the pressure of the spring 34, and the finger 48 on the trigger is disengaged from the clip 4ᵃ whereupon the clips grouped on the rail are moved forwardly by the feeder under pressure of its spring 22. Also, the jaws 10 are again spread properly apart by the pin 43 and the clip 4ᵃ is then automatically deposited in the notches of the jaws (Figs. 6-7) in readiness to be applied as in the previous instance with respect to the clip 4".

The arms 30 of the block 28 are disposed between the jaws 10 of the tweezers so that the inward or clinching movement of the jaws is limited by contact therewith which obviates collapse of the clips as they are clinched.

I claim:—

1. In a repeating ligature applying instrument, forceps having a stock and extending arms provided with notched jaws constituting tweezers, a hand-rest adjustably secured to said stock, a slide having limited longitudinal guided movement on said forceps, a spring to move said slide forwardly on the forceps, a bracket in the rear end of said slide, a magazine pivotally supported on said slide and having a rail with a downwardly curved free end adapted to support a series of ligatures thereon to be supplied to said tweezers, a spring-pressed feeder and guide-rod therefor disposed in said slide operably engageable with ligatures on said rail, a lock for holding said feeder in rearmost position means to lock said magazine in operating position on said bracket, and a pivoted spring-pressed trigger for operating said slide provided with a finger for controlling said ligatures as they are supplied from said rail to the tweezers.

2. A ligature applying instrument consisting of forceps with extending arms having notched jaws constituting tweezers, a hand-rest for said forceps, a spring-pressed slide having limited longitudinal guided movement on said forceps, a magazine supported on said slide having a rail with a downwardly curved free end adapted to support a series of ligatures thereon to be supplied to said tweezers, a spring-pressed feeder having guided movement adapted to engage and progress ligatures along said rail, locking means to hold said rail in operating position, and a trigger for operating the slide provided with a finger controlling the supply of ligatures from said rail to the tweezers.

3. A surgical instrument consisting of ligature applying tweezers provided with a hand-rest, a slide having longitudinal guided movement with respect to said tweezers, a ligature magazine and feeder therefor in connection with said slide for supplying ligatures to the tweezers, and a trigger in connection with the slide to operate it and having a finger engageable with ligatures arranged in the magazine singly and in successive order as they are fed to the tweezers upon operation of the slide so as to prevent over-running of said ligatures.

4. A surgical instrument consisting of ligature applying tweezers having jaws adapted to be sprung apart or toward each other, a slide having limited longitudinal guided movement on said tweezers and having a part disposed between said jaws that limits movement thereof toward each other, means in connection with slide adapted to spread said jaws apart when the slide is in one of its extreme positions relative to the tweezers, a ligature magazine and feeder therefor on said slide for supplying ligatures to said tweezers upon operation of said slide when the jaws are spread apart, and a trigger for operating the slide provided with a finger controlling the supply of ligatures from said magazine to the tweezers.

5. A surgical instrument consisting of ligature applying tweezers, a slide having limited longitudinal movement on said tweezers, means in connection with the slide operatively related with said jaws adapted to spread said jaws apart when the slide is in one of its extreme positions relative to the tweezers, a ligature magazine and feeder therefor on said slide for supplying ligatures to said tweezers upon operation of said slide when the jaws are spread apart, and a trigger for operating the slide provided with a finger controlling the supply of ligatures from said magazine to the tweezers.

EDWARD H. KRUSE.